US008729807B2

(12) United States Patent
Fu et al.

(10) Patent No.: US 8,729,807 B2
(45) Date of Patent: May 20, 2014

(54) LIGHT EMITTING DIODE DRIVING CIRCUIT

(75) Inventors: Xiao-Ping Fu, Shanghai (CN); Xing-Hua Zhang, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 89 days.

(21) Appl. No.: 13/571,813

(22) Filed: Aug. 10, 2012

(65) Prior Publication Data

US 2013/0320857 A1   Dec. 5, 2013

(30) Foreign Application Priority Data

Jun. 1, 2012   (CN) .......................... 2012 1 0179456

(51) Int. Cl.
*H05B 37/02*   (2006.01)
(52) U.S. Cl.
USPC ....................................... 315/122; 315/209 R
(58) Field of Classification Search
None
See application file for complete search history.

(56) References Cited

U.S. PATENT DOCUMENTS

| 5,751,120 | A  | * | 5/1998  | Zeitler et al.  | 315/307   |
| 7,378,805 | B2 | * | 5/2008  | Oh et al.       | 315/291   |
| 8,058,814 | B2 | * | 11/2011 | Yang            | 315/250   |
| 2002/0180380 | A1 | * | 12/2002 | Lin          | 315/224   |
| 2007/0138971 | A1 | * | 6/2007  | Chen         | 315/209 R |
| 2007/0152603 | A1 | * | 7/2007  | Nerone et al. | 315/247   |
| 2009/0179576 | A1 | * | 7/2009  | Yang         | 315/205   |
| 2009/0179578 | A1 | * | 7/2009  | Yang         | 315/250   |
| 2010/0045190 | A1 | * | 2/2010  | Cramer       | 315/151   |
| 2011/0291591 | A1 | * | 12/2011 | Shiu et al.  | 315/297   |

* cited by examiner

*Primary Examiner* — Crystal L Hammond
(74) *Attorney, Agent, or Firm* — CKC & Partners Co., Ltd.

(57) ABSTRACT

The present disclosure provides a light emitting diode driving circuit, comprising: a power conversion module having an input end, a control end and an output end, wherein the input end receives a voltage, the control end controls the regulation of the duty cycle signal therein according to a received control signal, and the output end outputs a DC voltage having a constant current and a variable voltage value; an overcurrent protection circuit having a switch module and a first resistor connected in series, wherein the overcurrent protection circuit and a LED load connected in series with each other are connected to the power conversion module, so as to turn off the electrical channel between the LED load and the power conversion module when overcurrent occurs; and an overvoltage protection circuit for outputting the control signal when overvoltage occurs and thereby protecting the LED load.

19 Claims, 16 Drawing Sheets

LIGHT EMITTING DIODE DRIVING CIRCUIT

RELATED APPLICATIONS

This application claims priority to Chinese Patent Application Serial Number 201210179456.X, filed Jun. 1, 2012, which is herein incorporated by reference.

BACKGROUND

1. Field of Invention

The present disclosure relates to a power driving circuit of an LED (light emitting diode) load. More particularly, the present disclosure relates to an LED driving circuit with overvoltage protection and overcurrent protection.

2. Description of Related Art

Currently, in order to keep consistent lamp brightness of the LED (light emitting diode) load, most of LED lamp manufacturers select a control manner in which a current passing through the LED is constant. When a power conversion module is not connected to the LED load, no current is generated since no loop is formed at an output end of the power conversion module. At the moment, for example, under the action of a negative feedback circuit, an output voltage of the power conversion module is boosted, and is likely to exceed the maximum load voltage that the LED load can bear. If the LED load is introduced into the power conversion module in a hot swapping manner, the introduced LED load causes damage to an LED lamp due to an overcurrent.

In order to solve risks of damage to the LED load above, the manufacturers often mark or note at an eye-catching position that electrical detachment between the interface of the LED load and the interface of the power conversion module is not allowed under normal operation state of the power driving circuit. However, in the conventional techniques, a user often privately separates the power conversion module under the operation state from the LED load and then reconnects the same. According to the circuit analysis process above, such violation operation behavior doubtlessly causes overcurrent damage to the LED load, and this is because that the output voltage of the power conversion module is very likely to be boosted far beyond the maximum load voltage that the LED load can bear, so that a high current peak value is formed in a short time after a circuit loop is formed.

In view of the above, many in the industry are endeavoring to find ways in which to design an LED driving circuit, in which under a no-load normal operation state of the power conversion module, even if a user plugs in or removes the LED load to the output end of the power conversion module on line, no overcurrent damage is caused to the LED load, thereby realizing dual protection of the power conversion module and the LED load.

SUMMARY

An aspect of the present disclosure is related to an LED driving circuit. The LED driving circuit includes a power conversion module, an overcurrent protection module and an overvoltage protection module. The power conversion module has an input end, an output end and a control end. The input end of the power conversion module is configured for receiving an input voltage. The control end of the power conversion module is configured for receiving a control signal so as to control the regulation of a duty cycle signal in the power conversion module according to the control signal. The power conversion module outputs a DC voltage having a constant current and a variable voltage value via the output end of the power conversion module according to the input voltage and the control signal. The overcurrent protection circuit includes a switch module and a first resistor. The switch module has a first end, a second end and a third end. The first end of the switch module is connected to a first end of an LED load. The first resistor has a first end and a second end. The first end of the first resistor is connected to the third end of the switch module. The second end of the first resistor is connected to the second end of the switch module. A second end of the LED load and the second end of the first resistor are connected to the output end of the power conversion module. The overcurrent protection circuit detects that whether the current flowing through the first resistor is an overcurrent, so as to turn off the electrical channel between the LED load and the power conversion module through the switch module when the overcurrent occurs. The overvoltage protection circuit is configured for detecting whether the DC voltage is an overvoltage, so as to output the control signal when the overvoltage occurs, thereby performing overvoltage protection on the LED load according to the control signal.

BRIEF DESCRIPTION OF THE DRAWINGS

In order to make the following as well as other aspects, features, advantages, and embodiments of the present disclosure more apparent, the accompanying drawings are described as follows:

FIG. 11(*b*) illustrates another specific embodiment of a non-isolation overvoltage protection circuit in the LED driving circuit of FIG. 5;

FIG. 12(*b*) illustrates another specific embodiment of an isolation overvoltage protection circuit in the LED driving circuit of FIG. 5.

DETAILED DESCRIPTION

Figure 1:
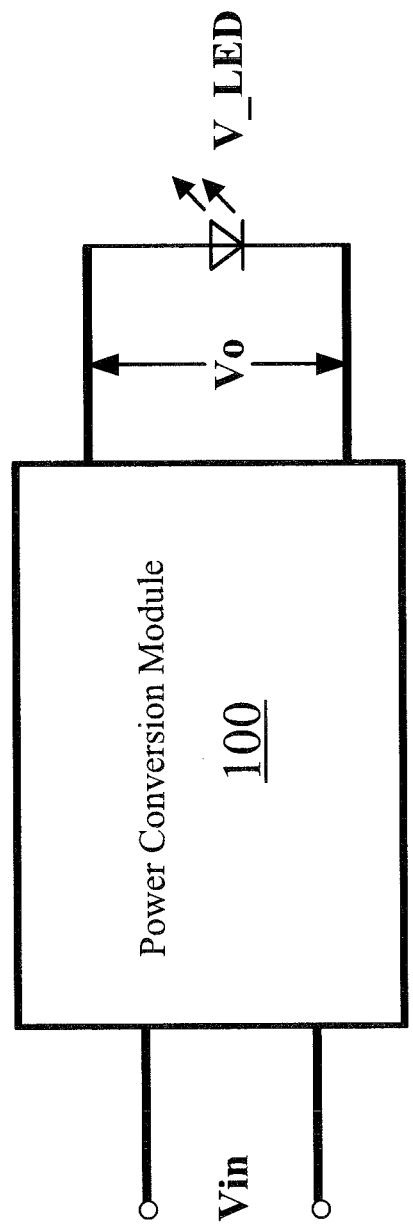
FIG. 1 illustrates a schematic view of circuit connection between a power conversion module and an LED load of an LED driving circuit.

In order to make the description of the present disclosure more detailed and more comprehensive, various embodiments are described below with reference to the accompanying drawings. The same reference numbers are used in the drawings to refer to the same or like elements. However, those of ordinary skills in the art should understand that the embodiments described below are not used for limiting the scope of the present disclosure. Moreover, the accompanying drawings are only illustrative and are not made according to the original size.

For the Detailed Description and the claims of this application, descriptions related to "coupled with" can generally refer to that a component is indirectly connected to another component through other components, or the component is directly connected to another component through no other components.

For the Detailed Description and the claims of this application, except articles are specifically limited in the context, otherwise, "a/an" and "the" refer to one or more.

The phrase "about", "approximately" or "roughly" in the context is used for modifying any micro-variable quantity, but these micro-variations do not change the nature of the quantity. In the embodiments the error of the quantity modified by the phrase "about", "approximately" or "roughly" is in a range of 20%, preferably in a range of 10%, and more preferably in a range of 5%, unless expressly specified otherwise.

Specific embodiments of the present disclosure are further described in details at all aspects below with reference to the accompanying drawings.

Figure 2:
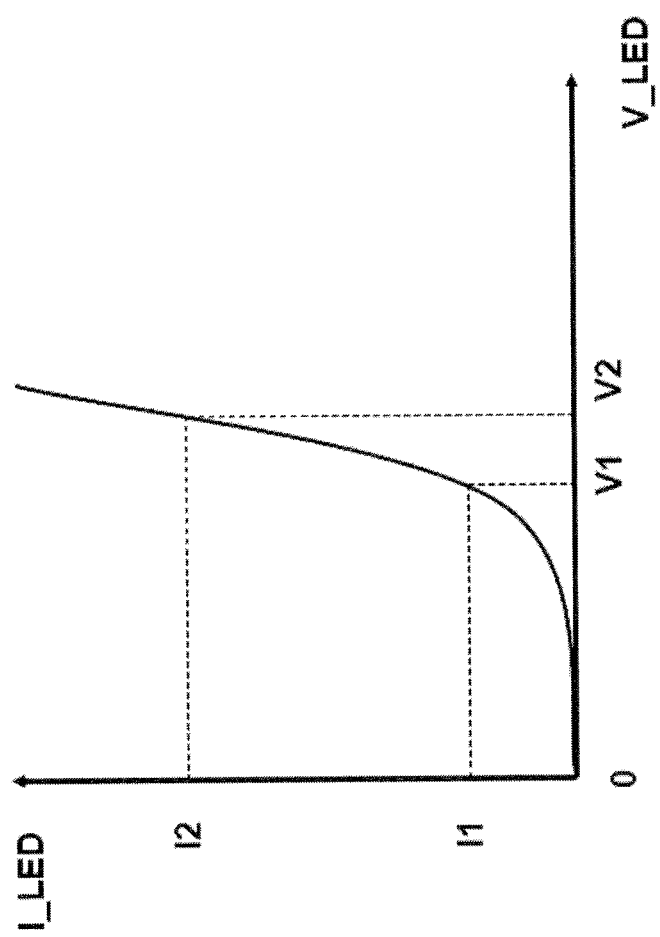
FIG. 2 illustrates a schematic view of a voltage-current characteristic curve of the LED load of FIG. 1.

FIG. 1 illustrates a schematic view of circuit connection between a power conversion module and an LED load of an LED driving circuit. FIG. 2 illustrates a schematic view of a voltage-current characteristic curve of the LED load of the FIG. 1.

Referring to FIG. 1, the power conversion module 100 includes an input end and an output end. The input end is configured for receiving an input voltage Vin. The output end outputs a DC voltage V0 according to the received input voltage Vin. More specifically, the output end of the power conversion module 100 includes a positive terminal and a negative terminal. A positive electrode of the LED load is electrically connected to the positive terminal at the output end of the power conversion module 100. The negative electrode of the LED load is electrically connected to the negative terminal at the output end of the power conversion module 100.

For example, the LED load is composed of a set of LED lamp strings. The LED lamp strings include two or more LEDs connected in series. The anode of the first LED of the LED lamp strings is electrically connected to the positive terminal at the output end of the power conversion module 100. The cathode of the last LED of the LED lamp strings is electrically connected to the negative terminal at the output end of the power conversion module 100. When the LED load is in the stable operation state, the output current at the output end of the power conversion module 100 is kept constant. Therefore, each LED of the LED load has continuously unchanged brightness.

In FIG. 2, V_LED represents a load voltage which is loaded to two ends of the LED load. I_LED represents a load current which flows through the LED load. It is not hard to see that the load current I_LED is increased along with increase of the load voltage V_LED. For example, when the load voltage V_LED is V1, the corresponding load current is I1. When the load voltage V_LED is V2, the corresponding load current is I2. When V2 is greater than V1, the corresponding load current I2 is greater than I1. It can be seen from the above that, when the power conversion module 100 is in the no-load state (that is, no LED load is connected), the output voltage V0 of the output end is obviously increased. At the moment, if the LED load is connected to the output end of the power conversion module 100, the load current I_LED, corresponding to the output voltage V0 loaded to two ends of the LED load, is also increased. When the load current I_LED exceeds the maximum current that the LED load can bear, the overcurrent damage is caused to the LED load.

Figure 3:
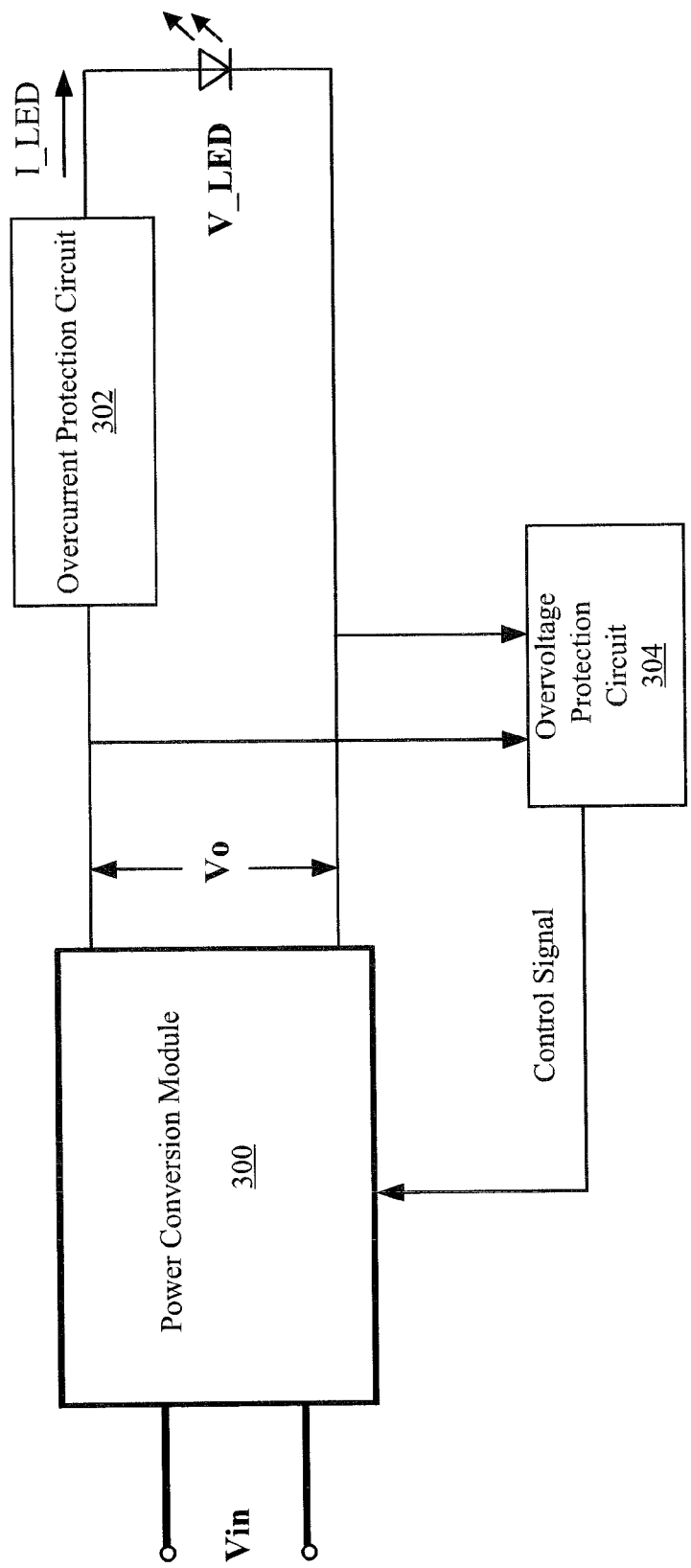
FIG. 3 illustrates a schematic circuit structure diagram of an LED driving circuit according to a specific embodiment of the present disclosure.

FIG. 3 illustrates a schematic circuit structure diagram of an LED driving circuit according to a specific embodiment of the present disclosure.

Referring to FIG. 3, the LED driving circuit of the present disclosure includes a power conversion module 300, an overcurrent protection circuit 302 and an overvoltage protection circuit 304.

The power conversion module 300 has an input end, an output end and a control end. The input end of the power conversion module 300 is configured for receiving an input voltage Vin. The input voltage Vin may be either an AC power supply or a DC power supply. The control end of the power conversion module 300 is configured for receiving a control signal from an overvoltage protection circuit 304, so as to control the regulation of a duty cycle signal in the power conversion module 300 according to the control signal. The power conversion module 300 outputs a DC voltage V0 having a constant current and a variable voltage value via the output end, according to the input voltage Vin and the control signal.

The overcurrent protection circuit 302 is arranged between the LED load and the output end of the power conversion module 300, and detects the current flowing through the LED load, so as to perform the overcurrent protection on the LED load. For example, the overcurrent protection circuit 302 is arranged between the LED load and the positive terminal at the output end of the power conversion module 300, and determines that whether the overcurrent protection should be performed by detecting the current flowing through the LED load. Also for example, the overcurrent protection circuit 302 is arranged between the LED load and the negative terminal at the output end of the power conversion module 300, and determines that whether the overcurrent protection should be performed by detecting the current flowing through the LED load. When the overcurrent protection is required to be performed on the LED load, the overcurrent protection circuit 302 turns off the electrical channel between the power conversion module 300 and the LED load.

The overvoltage protection circuit 304 is connected in parallel with the output end of the power conversion module 300, and configured for detecting whether the output voltage of the power conversion module 300 is the overvoltage. When overvoltage occurs, a control signal is outputted, so as to control the regulation of the duty cycle signal in the power conversion module 300 according to the control signal and inhibit boosting of the output voltage V0 of the power conversion module 300. In an embodiment, the overvoltage protection circuit 304 may be a non-isolation circuit. In another embodiment, the overvoltage protection circuit 304 may be an isolation circuit, and for example the output of the control signal and the treatment of a sample voltage signal are separated by using the optical coupler.

Figure 4A:
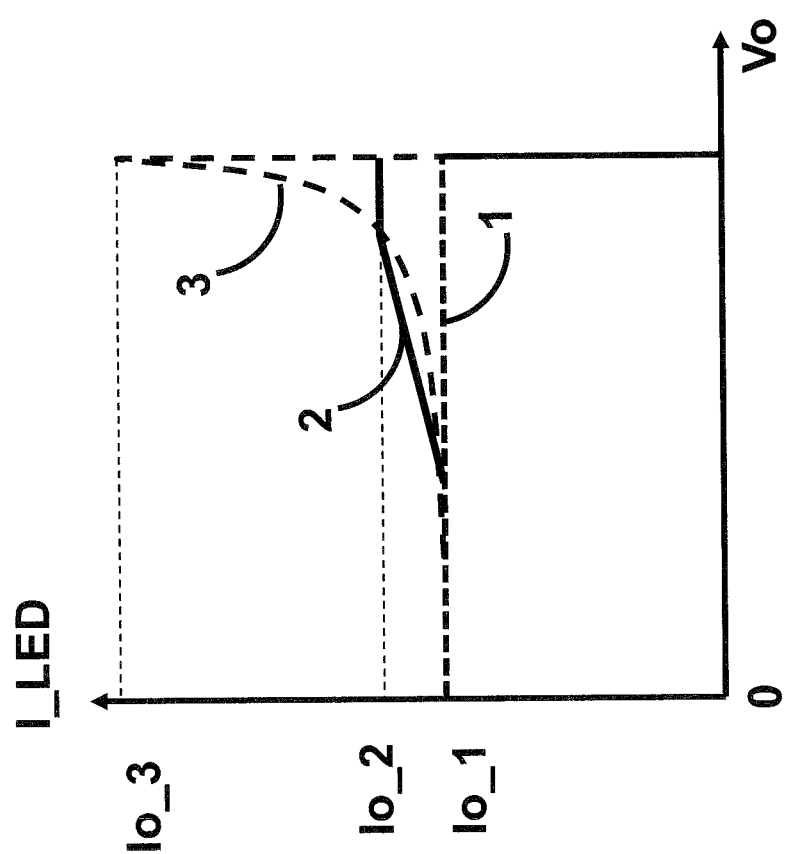
FIG. 4A illustrates a schematic view of each voltage-current characteristic curve at the output end of the power conversion module, before and after the overcurrent protection, during hot swapping of the LED load in the LED driving circuit of FIG. 3.

FIG. 4A illustrates a schematic view of each voltage-current characteristic curve at the output end of the power conversion module, before and after the overcurrent protection, during hot swapping of the LED load in the LED driving circuit of FIG. 3.

In FIG. 4A, when the LED load includes one or more LEDs connected in series, in a desired state, the voltage-current characteristic at the output end of the power conversion module corresponds to a curve 1 shown in the figure. That is, the constant output current corresponds to a rated operating current Io_1 of the LED load. When the LED load is hot-swapped in the power conversion module, before adoption of the overcurrent protection circuit of the present disclosure, the voltage-current characteristic at the output end of the power conversion module corresponds to a curve 3 shown in the figure. When the high output voltage is higher, the corresponding output current is sharply increased to Io_3, which easily causes overcurrent damage to the LED load. After adoption of the overcurrent protection circuit of the present disclosure, the voltage-current characteristic at the output end of the power conversion module corresponds to a curve 2 shown in the figure. Similarly, When the output voltage is higher, the corresponding output current is limited to Io_2, and further gradually decreased to the rated operating current Io_1 of the LED load. Due to the introduced overcurrent protection mechanism, no overcurrent damage is caused to the LED load.

Herein, the term "hot swapping" means that when the power conversion module of the LED driving circuit is in the normal operation state, without disconnecting the power supply, the LED load is directly plugged to the output end of the power conversion module. Alternatively, without disconnecting the power supply, the LED load is directly removed from the output end of the power conversion module. Additionally, it should be pointed out that the LED driving circuit of the preset disclosure only takes the hot swapping of the LED load as an example for schematically illustrating, and the present disclosure is not limited to this. For example, the overcurrent protection circuit can also be applicable for other LED driving circuits having no hot swapping of the LED load.

Figure 4B:
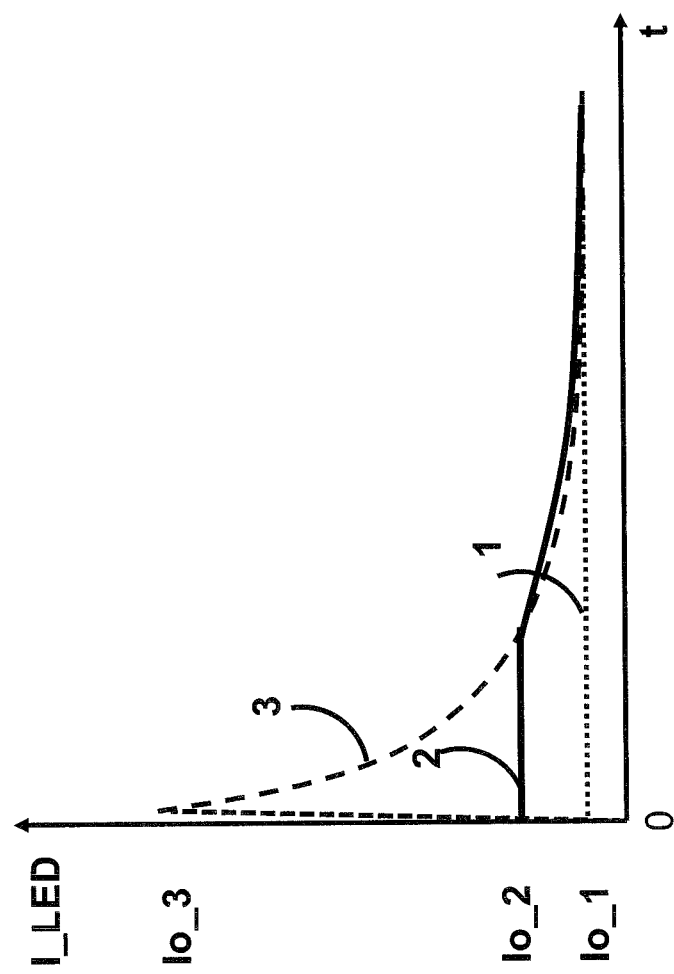
FIG. 4B illustrates a schematic view of each curve of the current flowing through the LED load and changing over time, before and after the overcurrent protection, during hot swapping of the LED load in the LED driving circuit of FIG. 3.

FIG. 4B illustrates a schematic view of each curve of the current flowing through the LED load and changing over time, before and after the overcurrent protection, during hot swapping of the LED load in the LED driving circuit of FIG. 3.

In FIG. 4B, when the LED load includes one or more LEDs connected in series, the characteristic of the current flowing through the LED load and changing over time in a desired state corresponds to a curve 1 shown in the figure. That is, the rated operating current Io_1 flowing through the LED load, has no change with the prolonged time. When the LED load is hot-swapped in the power conversion module, before adoption of the overcurrent protection circuit of the present disclosure, the characteristic of the current flowing through the LED load and changing over time corresponds to a curve 3 shown in the figure. In a short time, the current flowing through the LED load is sharply increased to Io_3, which easily causes the overcurrent damage to the LED load. After adoption of the overcurrent protection circuit of the present disclosure, the characteristic of the current flowing through the LED load and changing over time corresponds to a curve 2 shown in the figure, in which the current flowing through the LED load is kept as Io_2 in a long time, and further gradually decreased slowly to the rated operating current Io_1 of the LED load. Due to the introduced overcurrent protection mechanism, no overcurrent damage is caused to the LED load.

Figure 5:
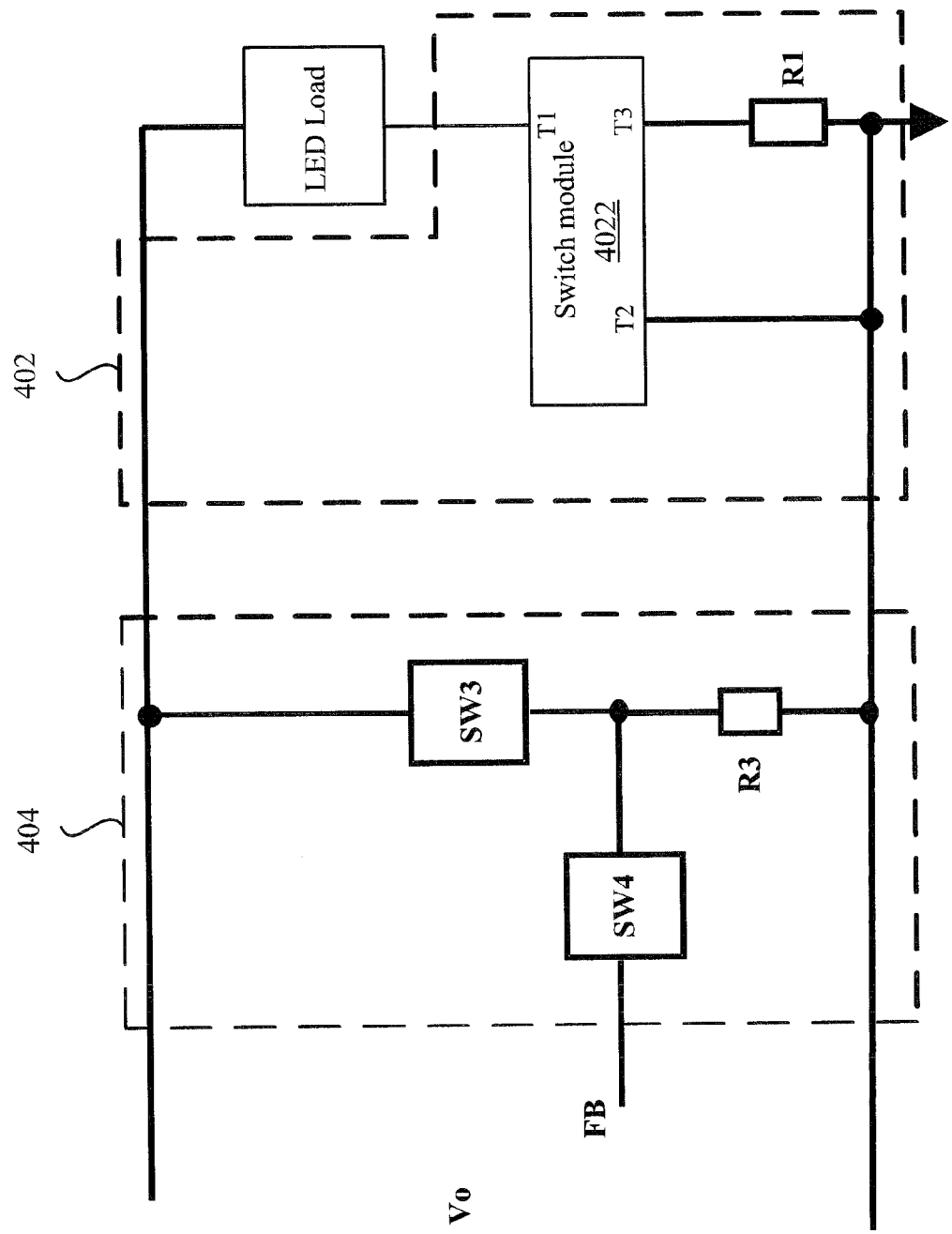
FIG. 5 illustrates a specific embodiment of an overvoltage protection circuit and an overcurrent protection circuit in the LED driving circuit of FIG. 3.

FIG. 5 illustrates a specific embodiment of an overvoltage protection circuit and an overcurrent protection circuit in the LED driving circuit of FIG. 3.

Referring to FIG. 5, the LED driving circuit includes an overvoltage protection circuit 404 and an overcurrent protection circuit 402. The overvoltage protection circuit 404 includes a first processing unit SW3 and a second processing unit SW4. The first end of the first processing unit SW3 is connected to one of the output ends of the power conversion module (the end may be a positive terminal or a negative terminal). The second end of the first processing unit SW3 is connected to the other one of the output ends of the power conversion module (the polarity of one of the output ends of the power conversion module is opposite to the other one of the output ends of the power conversion module) through a third resistor R3. The first end of the second processing unit SW4 is connected to the second end of the first processing unit SW3 and the third resistor R3. The second end of the second processing unit SW4 is configured for outputting a control signal FB to the control end of the power conversion module 300. The power conversion module 300 controls the regulation of the duty cycle signal in the power conversion module 300 according to the control signal FB. In this embodiment, the second processing unit SW4 may be a non-isolation circuit. In another embodiment, the second processing unit SW4 may be an isolation circuit, and for example the output of the control signal and the treatment of a sample voltage signal are separated by using an optical coupler.

The overcurrent protection circuit 402 includes a switch module 4022 and a first resistor R1. More specifically, the switch module 4022 has a first end T1, a second end T2 and a third end T3. The first end T1 is connected to the first end of the LED load. The second end T2 is connected to the second end of the first resistor R1. The third end T3 is connected to the first end of the first resistor R1. The third end T3 of the switch module is connected to the output end of the power conversion module through the first resistor R1. It should be understood that the term "the first end and the second end of the LED load" corresponds to the cathode or the anode of the LED load in various specific embodiments. More specifically, when the switch module 4022 adopts a circuit structure in which the NPN transistor cooperates with the NMOSFET, the first end of the LED load corresponds to the cathode of the LED load, and the second end of the LED load corresponds to the anode of the LED load. When the switch module 4022 adopts a circuit structure in which the PNP transistor cooperates with the PMOSFET, the first end of the LED load corresponds to the anode of the LED load, and the second end of the LED load corresponds to the cathode of the LED load.

The overcurrent protection circuit 402 detects that whether the current flowing through the first resistor R1 is the overcurrent, so as to turn off an electrical channel between the LED load and the power conversion module 300 through the switch module 4022 when the overcurrent occurs.

Figure 6:
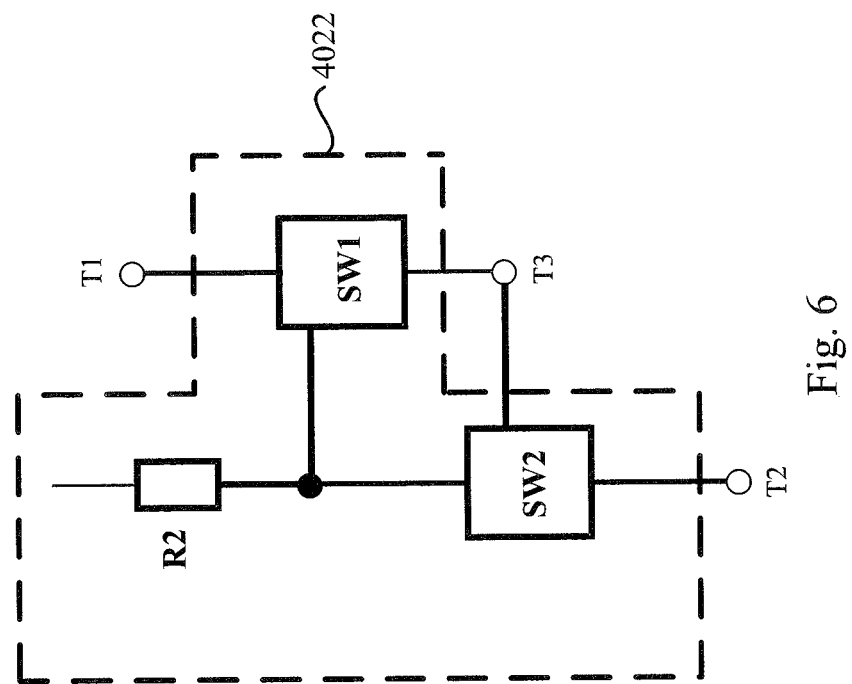
FIG. 6 illustrates a specific embodiment of a switch module in the overcurrent protection circuit of FIG. 5.

FIG. 6 illustrates a specific embodiment of a switch module in the overcurrent protection circuit of the FIG. 5. Referring both FIGS. 5 and 6, the switch module 4022 is a dual-switch mutual-control circuit. The switch module 4022 includes a first switch SW1 and a second switch SW2. The first end of the first switch SW1 is connected to the first end T1 of the switch module 4022 (i.e. being connected in series with the first end of the LED load). The second end of the first switch SW1 is connected to the third end T3 of the switch module 4022 (i.e. being connected in series with the first end of the first resistor R1). The third end of the first switch SW1 is connected to the second end of the LED load through a second resistor R2. The first end of the second switch SW2 is connected to the second resistor R2 and the third end of the first switch SW1. The second end of the second switch SW2 is connected to the second end T2 of the switch module 4022 (such as, the second end of the first resistor R1). The third end of the second switch SW2 is connected to the third end T3 of the switch module 4022 (i.e. being connected to the second end of the first switch SW1 and the first end of the first resistor R1). In an embodiment, the first switch SW1 is an NMOSFET (N-channel metal oxide semiconductor field effect transistor). The second switch SW2 is an NPN (negative-positive-negative) transistor. In another embodiment, the first switch SW1 is a PMOSFET (P-channel metal oxide semiconductor field effect transistor). The second switch SW2 is a PNP (positive-negative-positive) transistor.

Figure 7A:
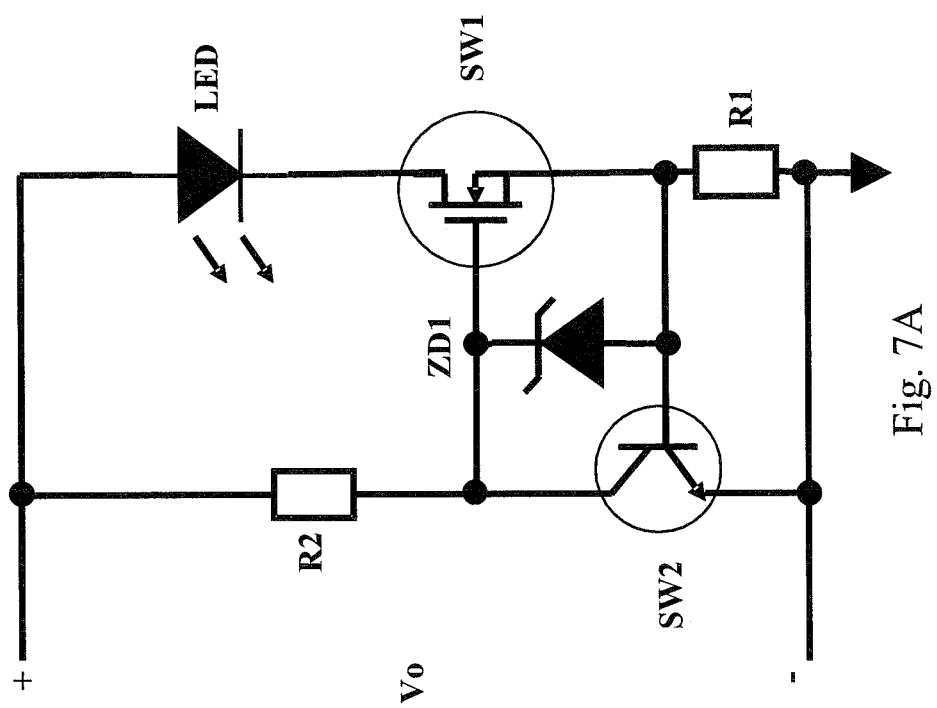
FIG. 7A illustrates a circuit structure diagram of a first embodiment in which the switch module of FIG. 6 is controlled in a dual-switch mutual-control manner.
Figure 7B:
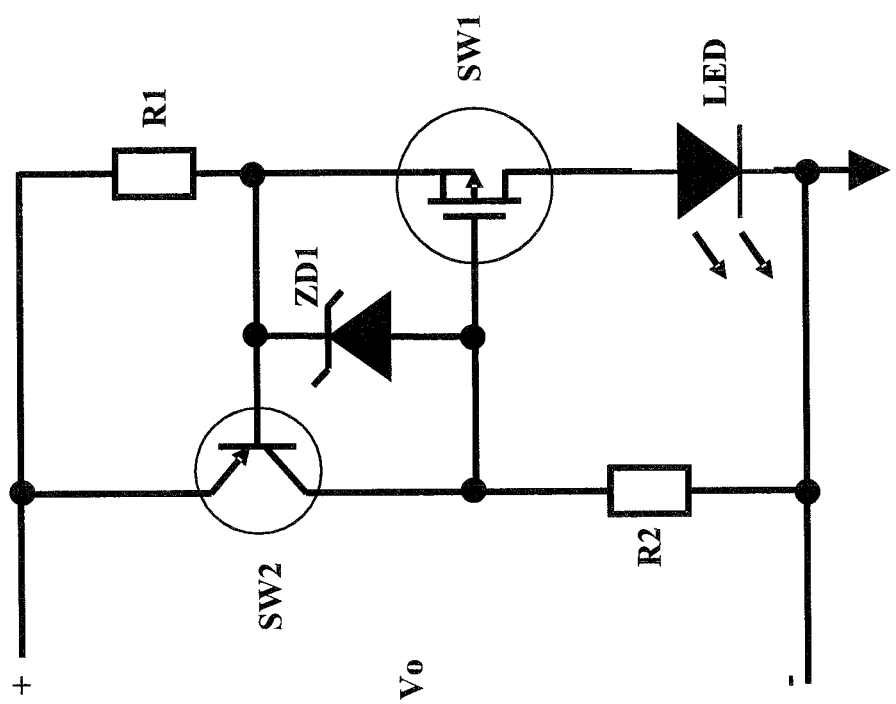
FIG. 7B illustrates a current structure diagram of a second embodiment in which the switch module of FIG. 6 is controlled in the dual-switch mutual-control manner.

In order to further illustrate the dual-switch mutual-control circuit shown in FIG. 6, FIG. 7A illustrates a circuit structure diagram of a first embodiment in which the switch module of FIG. 6 is controlled in a dual-switch mutual-control manner. FIG. 7B illustrates a current structure diagram of a second embodiment in which the switch module of the FIG. 6 is controlled in the dual-switch mutual-control manner.

Referring to FIG. 7A, the first switch SW1 is connected in series with the LED load. By means of turn-on or turn-off of the first switch SW1, the overcurrent protection is performed on the LED load. For example, the first switch SW1 is a MOSFET (metal oxide semiconductor field effect transistor) or a transistor. When the overcurrent happens to the circuit, the first switch SW1 is turned off, thereby cutting off the electrical channel of current flowing through the LED.

In an embodiment, the first switch SW1 is an NMOSFET (N-channel metal oxide semiconductor field effect transistor). The second switch SW2 is an NPN (negative-positive-negative) transistor. More specifically, a drain electrode of the NMOSFET is connected in series to the cathode of the LED load (i.e. the first end of the LED load). The source electrode of the NMOSFET is coupled to the negative terminal at the output end of the power conversion module through a first resistor R1. The gate electrode of the NMOSFET is connected to the positive terminal (i.e. the anode of the LED load) at the output end of the power conversion module through a second resistor R2. The collecting electrode of the NPN transistor is connected to the gate electrode of the NMOSFET and the second resistor R2. The emitting electrode of the NPN transistor is connected to the negative terminal (i.e. the second end of the first resistor R1) at the output end of the power conversion module. The base electrode of the NPN transistor is connected to the source electrode of the NMOSFET and the first end of the first resistor R1. Additionally, in order to protect the first switch SW1, a clamping circuit may further be bridge connected between the gate electrode and the source electrode of the NMOSFET. For example, the clamping circuit is a Zener diode.

In another embodiment, the first switch SW1 is a PMOSFET (P-channel metal oxide semiconductor field effect transistor). The second switch SW2 is a PNP (positive-negative-positive) transistor. More specifically, the source electrode of the PMOSFET is coupled to the positive terminal at the output end of the power conversion module through a first resistor R1. The drain electrode of the PMOSFET is connected in series to the anode of the LED load (i.e. the first end of the LED load). The gate electrode of the PMOSFET is connected to the negative terminal (i.e. the cathode of the LED load) at the output end of the power conversion module through a second resistor R2. The collecting electrode of the PNP transistor is connected to the gate electrode of the PMOSFET and the second resistor R2. The emitting electrode is connected to the positive terminal (i.e. the second end of the first resistor R1) at the output end of the power conversion module. The base electrode of the PNP transistor is connected to the source electrode of the PMOSFET and the first end of the first resistor R1. Similarly, in order to protect the first switch SW1, a clamping circuit may be further bridge connected between the gate electrode and the source electrode of the PMOSFET. For example, the clamping circuit is a Zener diode.

Figure 8:
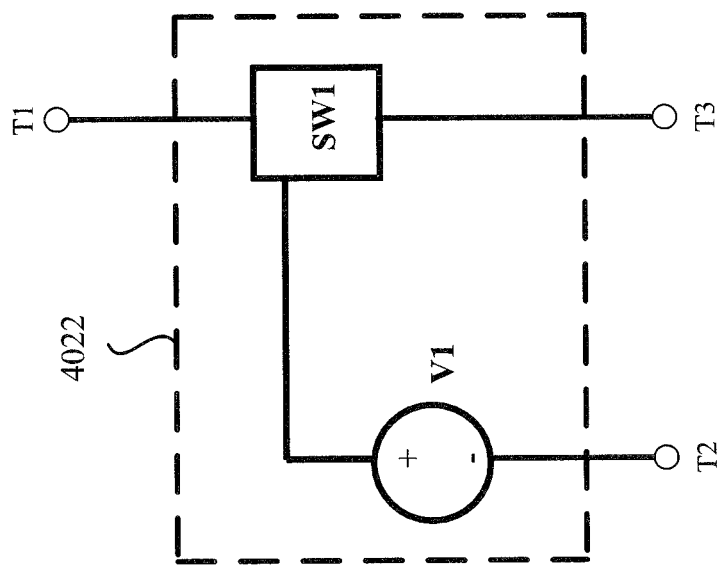
FIG. 8 illustrates another specific embodiment of the switch module in the overcurrent protection circuit of FIG. 5.

FIG. 8 illustrates another specific embodiment of the switch module in the overcurrent protection circuit of the FIG. 5.

Referring to FIG. 8, the switch module 4022 is a single-switch self-control circuit. Specifically, the single-switch self-control circuit includes a first switch SW1 and a power module V1. The first end of the first switch SW1 is connected to the first end T1 of the switch module 4022 (i.e. being connected in series to the first end of the LED load). The second end of the first switch SW1 is connected to the third end T3 of the switch module 4022 (i.e. being connected in series to the first end of the first resistor R1). The power module V1 has a first end and a second end. The first end of the power module V1 is connected to the third end of the first switch SW1. The second end of the power module V1 is connected to the second end T2 of the switch module 4022 (i.e. being connected to the second end of the first resistor R1). When the overcurrent occurs, by means of turn-off of the first switch SW1, the current channel between the output end of the power conversion module and the LED load is cut off, thereby performing the overcurrent protection.

In an embodiment, the first switch is an NPN transistor or an NMOSFET. The power module also includes a voltage stabilizing circuit which has a first end and a second end. The first end of the voltage stabilizing circuit is connected to the anode of the LED load through a second resistor R2. The second end is connected to the second end of the switch module 4022 (i.e. being connected to the second end of the first resistor R1). A connection point between the first end of the voltage stabilizing circuit and the second resistor is connected to the third end of the first switch.

In another embodiment, the first switch is a PNP transistor or a PMOSFET. The power module further includes a voltage stabilizing circuit which has a first end and a second end. The first end of the voltage stabilizing circuit is connected to the second end of the switch module 4022 (i.e. being connected to the second end of the first resistor R1). The second end of the voltage stabilizing circuit is connected to the cathode of the LED load through a second resistor R2. A connection point between the second end of the voltage stabilizing circuit and the second resistor is connected to the third end of the first switch.

Figure 9A:
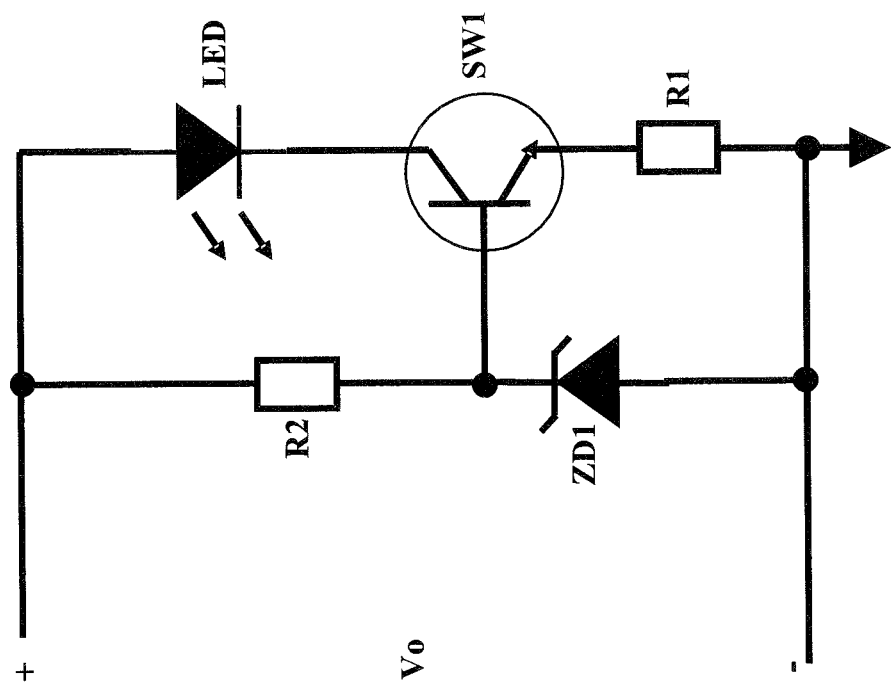
FIG. 9A illustrates a circuit structure diagram of a first embodiment in which the switch module of FIG. 8 is controlled in a single-switch self-control manner.
Figure 9B:
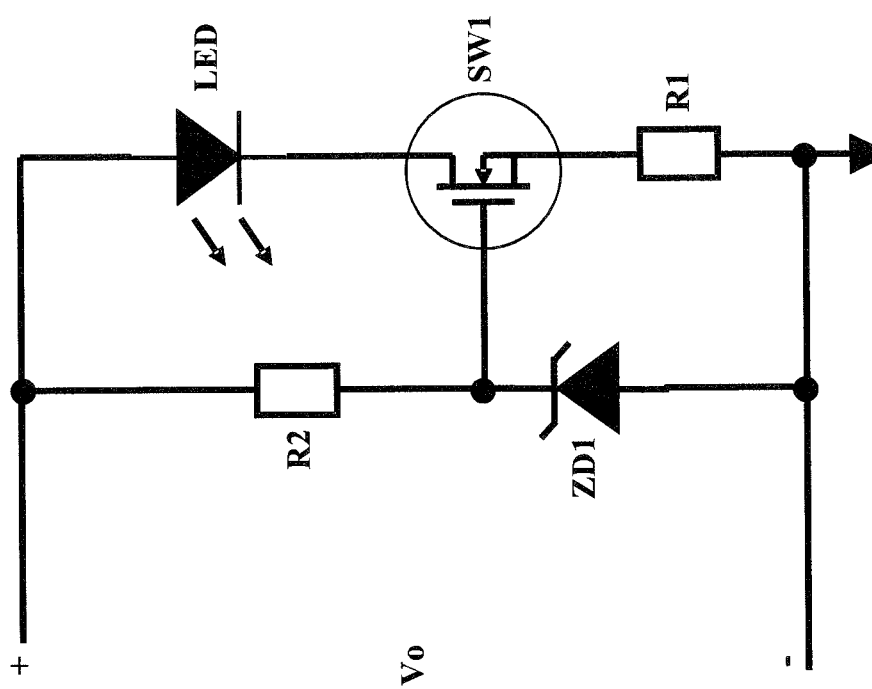
FIG. 9B illustrates a circuit structure diagram of a second embodiment in which the switch module of the FIG. 8 is controlled in the single-switch self-control manner.

FIG. 9A illustrates a circuit structure diagram of a first embodiment in which the switch module of the FIG. 8 is controlled in a single-switch self-control manner. FIG. 9B illustrates a circuit structure diagram of a second embodiment in which the switch module of the FIG. 8 is controlled in the single-switch self-control manner.

Comparing FIGS. 9A and 9B, it is not hard to see that the first switch SW1 shown in FIG. 9A is an NPN transistor. The first switch SW1 shown in FIG. 9B is an NMOSFET.

Referring both FIGS. 9A and 9B, it should be pointed out that when the first switch SW1 is the NPN transistor, the NPN transistor corresponds to the base electrode, the collecting electrode and the emitting electrode of the first switch SW1. When the first switch SW1 is the NMOSFET, the NMOSFET corresponds to the gate electrode, the source electrode and the drain electrode of the first switch SW1. The single-switch self-control circuit includes a first switch SW1. The collecting electrode (or the drain electrode) of the first switch SW1 is connected in series to the LED load. The emitting electrode (or the source electrode) of the first switch SW1 is coupled to the negative terminal at the output end of the power conversion module through a first resistor R1. The base electrode (or the gate electrode) of the first switch SW1 is coupled to the positive terminal at the output end of the power conversion module through a second resistor R2.

In a specific embodiment, the single-switch self-control overcurrent protection circuit further includes a voltage stabilizing circuit, which is bridge connected between the base electrode (or the gate electrode) of the first switch SW1 and the negative terminal at the output end of the power conversion module. For example, the voltage stabilizing circuit is a Zener diode ZD1.

Figure 10A:
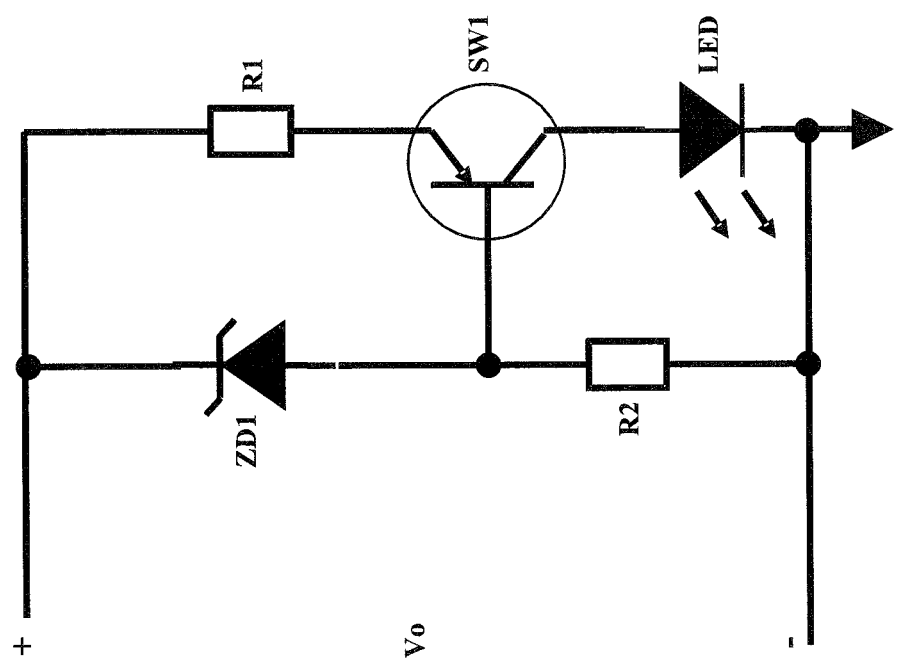
FIG. 10A illustrates a circuit structure diagram of a third embodiment in which the switch module of the FIG. 8 is controlled in the single-switch self-control manner.
Figure 10B:
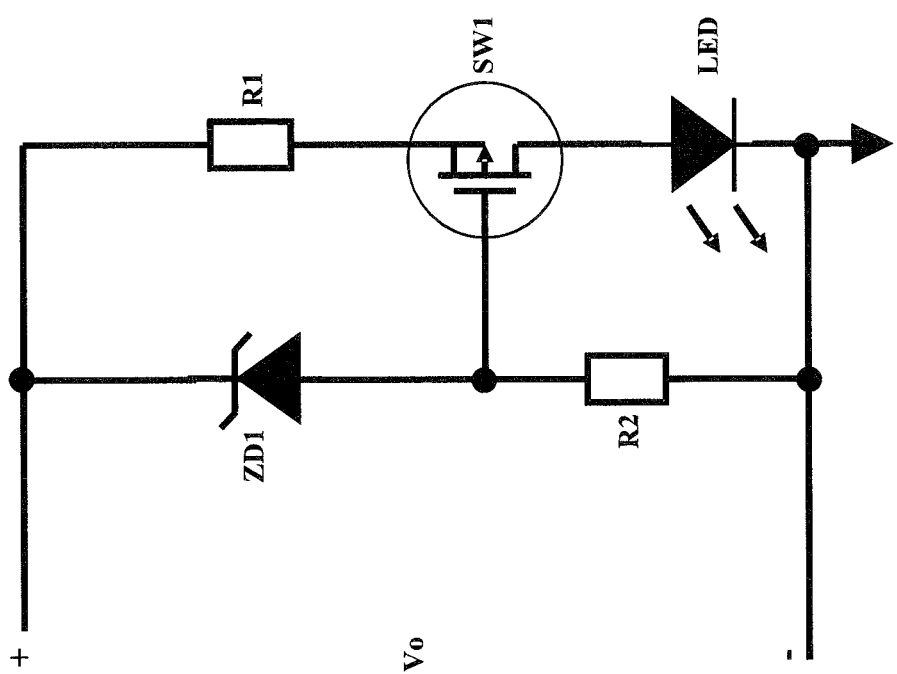
FIG. 10B illustrates a circuit structure diagram of a fourth embodiment in which the switch module of the FIG. 8 is controlled in the single-switch self-control manner.

FIG. 10A illustrates a circuit structure diagram of a third embodiment in which the switch module of the FIG. 8 is controlled in the single-switch self-control manner. FIG. 10B illustrates a circuit structure diagram of a fourth embodiment in which the switch module of the FIG. 8 is controlled in the single-switch self-control manner. Similar to FIGS. 9A and 9B, the main difference between FIGS. 10A and 10B lies in that the first switch SW1 shown in FIG. 10A is a PNP transistor, while the first switch SW1 shown in FIG. 10B is a PMOSFET.

Referring both FIGS. 10A and 10B, the single-switch self-control overcurrent protection circuit includes a first switch SW1. The collecting electrode (or the drain electrode) of the first switch SW1 is connected in series to the LED load. The emitting electrode (or the source electrode) of the first switch SW1 is coupled to the positive terminal at the output end of the power conversion module through a first resistor R1. The base electrode (or the gate electrode) of the first switch SW1 is coupled to the negative terminal at the output end of the power conversion module through a second resistor R2. Herein, when being the PNP transistor, the first switch SW1 has the collecting electrode, the emitting electrode and the base electrode. When being the PMOSFET, the first switch SW1 has the drain electrode, the source electrode and the gate electrode.

In a specific embodiment, the single-switch self-control circuit further includes a voltage stabilizing circuit, which is bridge connected between the base electrode (or the gate electrode) of the first switch SW1 and the positive terminal at the output end of the power conversion module. For example, the voltage stabilizing circuit is a Zener diode ZD1.

Figure 11:
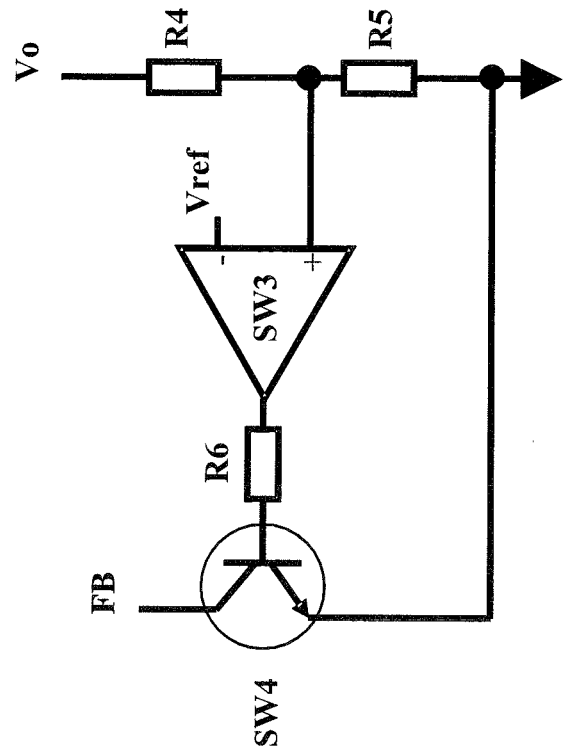
FIG. 11(*a*) illustrates a specific embodiment of a non-isolation overvoltage protection circuit in the LED driving circuit of FIG. 5.
Figure 11:
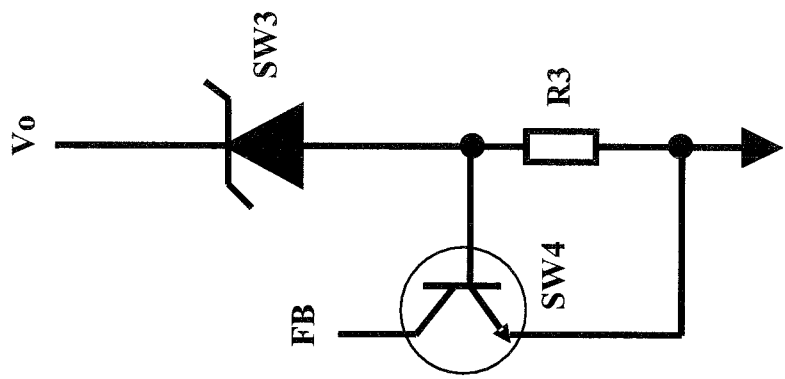

FIG. 11(a) illustrates a specific embodiment of a non-isolation overvoltage protection circuit in the LED driving circuit of the FIG. 5.

Referring to FIG. 11(a), the non-isolation overvoltage protection circuit includes a first processing unit SW3 and a second processing unit SW4. The first processing unit SW3 is the Zener diode. The second processing unit is an NPN transistor.

Specifically, the first end of the Zener diode is connected to the positive terminal Vo at the output end of the power conversion module. The second end is connected to the negative terminal at the output end of the power conversion module through a third resistor R3. The base electrode of the NPN transistor is connected to the second end of the Zener diode SW3. The emitting electrode of the NPN transistor is connected to the negative terminal at the output end of the power conversion module. The collecting electrode of the NPN transistor is connected to the control end of the power conversion module, thereby outputting the control signal FB to the control end of the power conversion module.

It should be understood that FIG. 11(a) only schematically illustrates the situation when the second processing unit is the NPN transistor. However, in some other embodiments, the corresponding overvoltage protection circuit may be established on the basis that the second processing unit is the PNP transistor. Certainly, the established overvoltage protection circuit should also be included in the scope of the present disclosure.

FIG. 11(b) illustrates another specific embodiment of the non-isolation overvoltage protection circuit in the LED driving circuit of the FIG. 5.

Referring to FIG. 11(b), the non-isolate overvoltage protection circuit includes a first processing unit SW3 and a second processing unit SW4. The first processing unit SW3 is an operational amplifier. The second processing unit is an NPN transistor. Specifically, the first input end (for example, a positive-phase input end) of the operational amplifier SW3 is connected to the positive terminal Vo at the output end of the power conversion module through the first divider resistor R4. Furthermore, the first input end is connected to the negative terminal at the output end of the power conversion module through the second divider resistor R5. The second input end (for example, a negative-phase input end) of the operational amplifier SW3 is connected to a reference voltage Vref. The output end of the operational amplifier is connected to the base electrode of the NPN transistor SW4 through a resistor R6. The emitting electrode of the NPN transistor SW4 is connected to the negative terminal at the output end of the power conversion module. The collecting electrode of the NPN transistor SW4 is connected to the control end of the power conversion module, thereby outputting the control signal FB.

FIG. 12(a) illustrates a specific embodiment of an isolation overvoltage protection circuit in the LED driving circuit of the FIG. 5.

Referring to FIG. 12(a), the isolation overvoltage protection circuit includes a first processing SW3 and a second processing unit SW4. The first processing unit SW3 is the Zener diode. The second processing unit is an optical coupler. Specifically, the first end of the Zener diode SW3 is connected to the positive terminal Vo at the output end of the power conversion module. The input side of the optical coupler SW4 is connected to a resistor R3 and the second end of the Zener diode SW3. The output side of the optical coupler SW4 outputs the control signal FB to the control end of the power conversion module.

Figure 12:
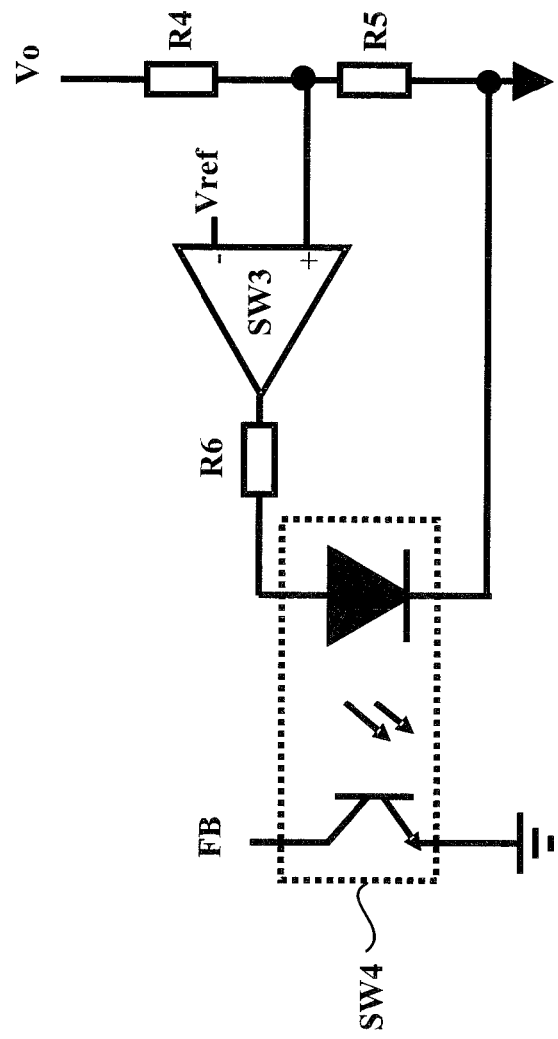
FIG. 12(*a*) illustrates a specific embodiment of an isolation overvoltage protection circuit in the LED driving circuit of FIG. 5.
Figure 12:
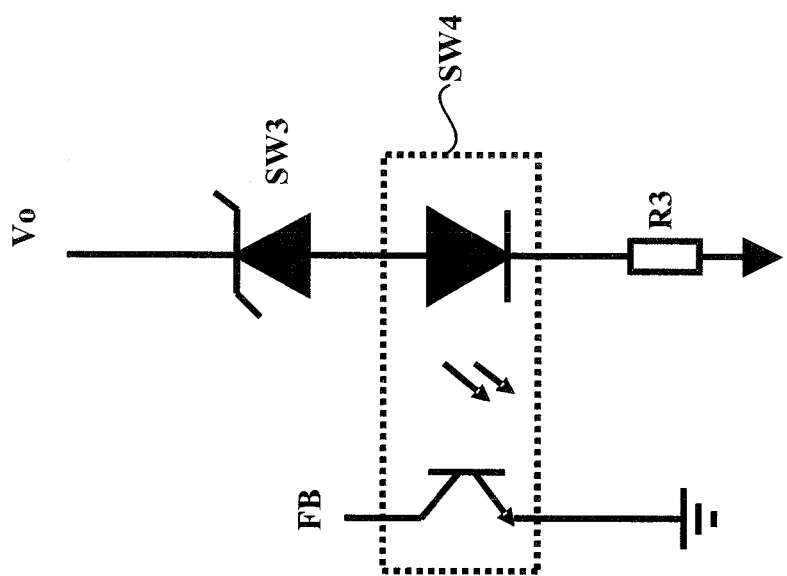

FIG. 12(*b*) illustrates another specific embodiment of the isolation overvoltage protection circuit in the LED driving circuit of the FIG. 5.

Referring to FIG. 12(*b*), the isolation overvoltage protection circuit includes a first processing unit SW3 and a second processing unit SW4. The first processing unit SW3 is the operational amplifier. The second processing unit SW4 is an optical coupler. Specifically, the positive-phase input end of the operational amplifier SW3 is connected to the positive terminal Vo at the output end of the power conversion module through the first divider resistor R4. The positive-phase input end is connected to the negative terminal at the output end of the power conversion module through the second divider resistor R5. The negative-phase input end of the operational amplifier SW3 receives a reference voltage Vref. The output end of the operational amplifier SW3 is connected to the input side of the optical coupler SW4 through a resistor R6. The output side of the optical coupler SW4 outputs the control signal FB to the control end of the power conversion module.

With adoption of the LED driving circuit of the present disclosure, the overcurrent protection circuit is arranged between the LED load and the output end of the power conversion module, so as to perform the overcurrent protection on the LED load. At the same time, by means of the overvoltage protection circuit detects whether the DC voltage is the overvoltage so as to output the control signal when overvoltage occurs, so that the power conversion module controls the regulation of the duty cycle signal according to the control signal and the input voltage, thereby performing the overvoltage protection on the LED load. When the LED driving circuit is applied to the hot swapping of the LED load, the output current of the power conversion module can be limited below the rated current of the LED load, thereby preventing overcurrent or overvoltage from happening during the hot swapping process of the LED load, protecting the power conversion module and the LED load, and improving stability and reliability during operation of the LED driving circuit.

Although the present disclosure has been disclosed with reference to the above embodiments, these embodiments are not intended to limit the present disclosure. It will be apparent to those skilled in the art that various modifications and variations can be made without departing from the scope or spirit of the present disclosure. Therefore, the scope of the present disclosure shall be defined by the appended claims.

What is claimed is:

1. A light emitting diode (LED) driving circuit, comprising:
   a power conversion module having an input end, an output end and a control end, wherein the input end of the power conversion module is configured for receiving an input voltage, the control end of the power conversion module is configured for receiving a control signal so as to control the regulation of a duty cycle signal in the power conversion module according to the control signal, and the power conversion module outputs a DC voltage having a constant current and a variable voltage value via the output end of the power conversion module according to the input voltage and the control signal;
   an overcurrent protection circuit, comprising:
      a switch module having a first end, a second end and a third end, wherein the first end of the switch module is connected to a first end of an LED load; and
      a first resistor having a first end and a second end, wherein the first end of the first resistor is connected to the third end of the switch module, the second end of the first resistor is connected to the second end of the switch module, a second end of the LED load and the second end of the first resistor are connected to the output end of the power conversion module, the overcurrent protection circuit detects that whether a current flowing through the first resistor is an overcurrent, so as to turn off the electrical channel between the LED load and the power conversion module through the switch module when the overcurrent occurs; and
   an overvoltage protection circuit for detecting whether the DC voltage is an overvoltage, so as to output the control signal when the overvoltage occurs, thereby performing overvoltage protection on the LED load according to the control signal.

2. The LED driving circuit of claim 1, wherein the switch module is a dual-switch mutual-control circuit, and the dual-switch mutual-control circuit comprises:
   a first switch, wherein a first end of the first switch is connected to the first end of the switch module, a second end of the first switch is connected to the third end of the switch module, and a third end of the first switch is connected to the second end of the LED load through a second resistor; and
   a second switch, wherein a first end of the second switch is connected to the second resistor and the third end of the first switch; a second end of the second switch is connected to the second end of the switch module, and a third end of the second switch is connected to the third end of the switch module.

3. The LED driving circuit of claim 2, wherein the first switch is an NMOSFET (n-channel metal oxide semiconductor field effect transistor), and the second switch is an NPN (negative-positive-negative) transistor.

4. The LED driving circuit of claim 3, wherein the overcurrent protection circuit further comprises a clamping circuit, which is bridge connected between a gate electrode and a source electrode of the NMOSFET.

5. The LED driving circuit of claim 2, wherein the first switch is a PMOSFET (P-channel metal oxide semiconductor field effect transistor), and the second switch is a PNP (positive-negative-positive) transistor.

6. The LED driving circuit of claim 5, wherein the overcurrent protection circuit further comprises a clamping circuit, which is bridge connected between a gate electrode and a source electrode of the PMOSFET.

7. The LED driving circuit of claim 1, wherein the switch module is a single-switch self-control circuit, and the single-switch self-control circuit comprises:
   a first switch, wherein a first end of the first switch is connected to the first end of the switch module, and a second end of the first switch is connected to the third end of the switch module; and
   a power module having a first end and a second end, wherein the first end of the power module is connected to a third end of the first switch, and the second end of the power module is connected to the second end of the switch module.

8. The LED driving circuit of claim 7, wherein the first switch is an NPN (negative-positive-negative) transistor or an NMOSFET (N-channel metal oxide semiconductor field effect transistor).

9. The LED driving circuit of claim 8, wherein the power module comprises:
   a voltage stabilizing circuit having a first end and a second end, wherein the first end of the voltage stabilizing circuit is connected to an anode of the LED load through a second resistor, the second end of the voltage stabilizing circuit is connected to the second end of the switch module; and wherein a connection point between the first end of the voltage stabilizing circuit and the second resistor is connected to the third end of the first switch.

10. The LED driving circuit of claim 7, wherein the first switch is a PNP (positive-negative-positive) transistor or a PMOSFET (P-channel metal oxide semiconductor field effect transistor).

11. The LED driving circuit of claim 10, wherein the power module comprises:
a voltage stabilizing circuit having a first end and a second end, wherein the first end of the voltage stabilizing circuit is connected to the second end of the switch module, the second end of the voltage stabilizing circuit is connected to a cathode of the LED load through a second resistor, and wherein a connection point between the second end of the voltage stabilizing circuit and the second resistor is connected to the third end of the first switch.

12. The LED driving circuit of claim 1, wherein the overvoltage protection circuit comprises:
a first processing unit, wherein a first end of the first processing unit is connected to a positive terminal at the output end of the power conversion module, and a second end of the first processing unit is coupled to a negative terminal at the output end of the power conversion module through a third resistor; and
a second processing unit, wherein a second end of the second processing unit is configured for outputting the control signal, and a first end of the second processing unit is connected to the second end of the first processing unit and the third resistor.

13. The LED driving circuit of claim 12, wherein the second processing unit is an isolation circuit or a non-isolation circuit.

14. The LED driving circuit of claim 13, wherein the first processing unit is a Zener diode and the second processing unit is a NPN (negative-positive-negative) transistor;
wherein a first end of the Zener diode is connected to the positive terminal at the output end of the power conversion module, a second end of the Zener diode is connected to the negative terminal at the output end of the power conversion module through the third resistor, a base electrode of the NPN transistor is connected to the second end of the Zener diode, an emitting electrode of the NPN transistor is connected to the negative terminal at the output end of the power conversion module, and a collecting electrode of the NPN transistor is connected to the control end of the power conversion module.

15. The LED driving circuit of claim 13, wherein the first processing unit is an operational amplifier and the second processing unit is an NPN (negative-positive-negative) transistor;
wherein a first input end of the operational amplifier is connected to the positive terminal at the output end of the power conversion module through a first divider resistor, and further connected to the negative terminal at the output end of the power conversion module through a second divider resistor, a second input end of the operational amplifier is connected to a reference voltage, an output end of the operational amplifier is connected to the base electrode of the NPN transistor through a resistor; the emitting electrode of the NPN transistor is connected to the negative terminal at the output end of the power conversion module, and the collecting electrode of the NPN transistor is connected to the control end of the power conversion module.

16. The LED driving circuit of claim 13, wherein the first processing unit is a Zener diode and the second processing unit is an optical coupler;
wherein a first end of the Zener diode is connected to the positive terminal at the output end of the power conversion module, an input side of the optical coupler is connected between a resistor and a second end of the Zener diode, and an output side of the optical coupler outputs the control signal to the control end of the power conversion module.

17. The LED driving circuit of claim 13, wherein the first processing unit is an operational amplifier and the second processing unit is an optical coupler;
wherein a first input end of the operational amplifier is connected to the positive terminal at the output end of the power conversion module through a first divider resistor and further connected to the negative terminal at the output end of the power conversion module through a second divider resistor, the second input end of the operational amplifier is connected to a reference voltage, an output end of the operational amplifier is connected to the input side of the optical coupler through a resistor, and an output side of the optical coupler outputs the control signal to the control end of the power conversion module.

18. The LED driving circuit of claim 1, wherein the LED load is one or more LED lamp strings connected in parallel.

19. The LED driving circuit of claim 18, wherein each LED lamp string comprises one or more LEDs connected in series.

* * * * *